United States Patent [19]

Takata

[11] Patent Number: 4,895,462

[45] Date of Patent: Jan. 23, 1990

[54] BEARING ASSEMBLY

[75] Inventor: Hirotoshi Takata, Yokohama, Japan

[73] Assignee: Nippon Seiko Kabushiki Kaisha, Tokyo, Japan

[21] Appl. No.: 233,203

[22] Filed: Aug. 17, 1988

[30] Foreign Application Priority Data

Aug. 17, 1987 [JP] Japan .................................. 62-203915

[51] Int. Cl.$^4$ ............................................. F16C 19/52
[52] U.S. Cl. ..................................... 384/493; 384/557; 384/585
[58] Field of Search ............... 384/450, 493, 517, 519, 384/537, 538, 540, 557, 559, 560, 561, 562, 563, 584, 585

[56] References Cited

FOREIGN PATENT DOCUMENTS

| 3141841 | 5/1983 | Fed. Rep. of Germany | 384/517 |
| 0175313 | 8/1986 | Japan | 384/493 |
| 180022 | 8/1986 | Japan . | |
| 252917 | 11/1986 | Japan . | |
| 252918 | 11/1986 | Japan . | |
| 34309 | 2/1988 | Japan . | |

Primary Examiner—Thomas R. Hannon
Attorney, Agent, or Firm—Basile and Hanlon

[57] ABSTRACT

A bearing assembly in which at least one of an outer and an inner raceway ring of a bearing has inclined end surfaces, inclined at angles $\theta_1$ and $\theta_2$ with respect to the vertical bearing center line. The angles $\theta_1$ and $\theta_2$ are determined to satisfy a relationship:

$$\tan \theta_1 + \tan \theta_2 = 2W_p/D_p$$

between an axial length $W_p$ and a diameter $D_p$ of the at least one raceway ring measured at the center of the thickness of the raceway ring.

1 Claim, 2 Drawing Sheets

ND ASSEMBLY

BACKGROUND OF THE INVENTION

1. Field of the Invention

The present invention relates to a bearing assembly in which a raceway ring of a bearing has a different linear expansion coefficient from that of an opposite member or a bearing mounting member to which the raceway ring is mounted.

2. Description of the Relevant Art

A raceway ring of a bearing having a different linear expansion coefficient from an opposite member, such as a bearing box or a shaft on which the raceway ring is mounted, for example, a bearing inner ring made of ceramic secured to a rotary shaft made of steel by using an inner ring clamp and a clamping nut, is disclosed in Japanese Patent Laid-Open Publication No. 61-252917.

In the bearing securing device disclosed in the above-mentioned patent publication, side surfaces of the bearing inner ring made of ceramic and side surfaces (axial end surfaces) of the inner ring clamp are formed to be cones, or either of the side surfaces of the bearing inner ring or the side surfaces of the inner ring clamp are formed to be spheres. The bearing inner ring and the inner ring clamp are brought into close contact with a predetermined contact angle $\theta$, or into point contact. As a result, when an environmental temperature is changed during use, relative displacements of the bearing inner ring and the inner ring clamp at the contact surface or contact point are equal to each other thereby absorbing a difference in expansion by heat among the shaft, bearing inner ring and inner ring clamp.

In the above-mentioned bearing securing device, the contact angle $\theta$, when the bearing inner ring and the inner ring clamp are brought into close contact with their side surfaces in the form of cones, is calculated using a relationship which includes a total of seven functions: linear expansion coefficients of the bearing inner ring, inner ring clamp, and shaft; a radius R from the center of the bearing; and widths (axial lengths) of the bearing inner ring, and bearing fixed portion of the shaft, except the inner clamp ring and screw portion, at positions of the radius R.

As a result, in calculating the contact angle $\theta$, it is necessary to obtain a value of the linear expansion coefficient and an axial length of each of the components, thereby involving significant time and complexity.

SUMMARY OF THE INVENTION

It is an object of the present invention to address the above-mentioned problem and to provide a bearing assembly in which the angles of both side surfaces of a raceway ring having a different linear coefficient from that of an opposite or mounting member can be determined using only the dimensions of an axial length and a diameter of the raceway ring.

In the bearing assembly of the present invention, at least one of an inner raceway ring and an outer raceway ring of a bearing has a different linear expansion coefficient from that of an opposite or mounting member to which the bearing is mounted. End surfaces of at least one of the raceway rings having the different linear coefficient from the opposite or mounting member are inclined surfaces which are slanted with respect to the vertical center line of the bearing. Distance pieces which are fixed by sandwiching the inclined surfaces of the raceway ring have a linear expansion coefficient substantially equal to that of the opposite member.

The following relationship exists among angles $\theta_1$ and $\theta_2$ of both end surfaces, with respect to the center line of the bearing, of at least one raceway ring having the different linear expansion coefficient from that of the opposite member, an axial length $W_p$ and a diameter $D_p$ of the raceway ring at the center of the thickness:

$$\tan\theta_1 + \tan\theta_2 = 2W_p/D_p$$

where, a positive sign is used for an angle of aperture extending outwardly with respect to the bearing center line, and a negative sign is used for an angle of aperture extending inwardly.

The above-mentioned raceway ring is fitted to the opposite or mounting member with an appropriate clearance depending on a magnitude relation between the linear expansion coefficients of the raceway ring and the opposite member, and conditions for temperature at which the raceway ring is used. The distance pieces are fitted to the opposite member by interference fitting or the like, or are secured to the opposite member using a locking nut and a snap.

The manner of mounting the inner raceway ring or the outer raceway ring to a shaft or the bearing box, which is designated as the opposite member, is selected as follows.

When the linear expansion coefficient of the inner raceway ring is smaller than the linear expansion coefficient of the shaft, loose fitting is selected when the bearing is to be used at a temperature higher than the temperature during mounting, and interference fitting is selected when the bearing is to be used at a temperature lower than the temperature during the mounting.

When the linear expansion coefficient of the inner raceway ring is larger than the linear expansion of the shaft, loose fitting is selected when the bearing is to be used at a temperature lower than the temperature during mounting, and interference fitting is selected when the bearing is to be used at a temperature higher than the temperature during the mounting.

With regard to the outer raceway ring, generally, a loose fitting is selected regardless of the linear expansion coefficient and the temperature during use. However, even when the linear expansion coefficient of the outer raceway ring is smaller than that of the bearing box, if the bearing is to be used at a temperature that is higher than that during mounting, the interference fitting may be selected. Also, even when the linear expansion coefficient of the outer raceway ring is larger than that of the bearing box, if the bearing is to be used at a temperature lower than that during mounting, the interference fitting may be selected.

Other objects and features of the invention will become apparent by reference to the following specification and to the drawings.

DESCRIPTION OF THE PREFERRED EMBODIMENTS

Figure 1B:
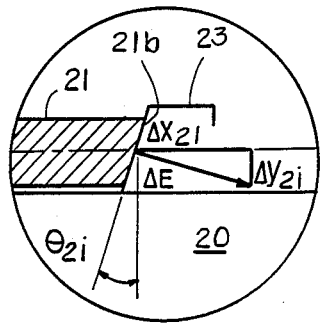
FIG. 1b is an enlarged partial sectional view of the bearing assembly of FIG. 1 which illustrates the relationship of $\Delta X$ and $\Delta Y$ to the bearing assembly.
Figure 1:
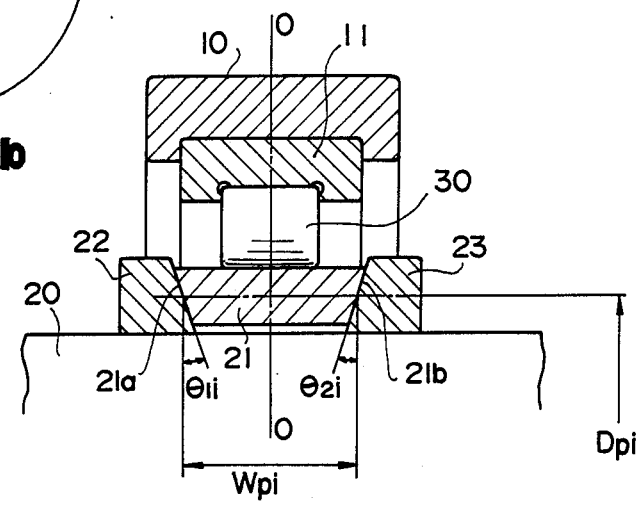
FIG. 1 is a longitudinal sectional view of an upper half portion of a bearing assembly including a cylindrical roll bearing illustrating an embodiment of the invention.

FIGS. 1 and 1b illustrate an embodiment of the invention as applied to an inner ring of a cylindrical roll bearing.

A bearing box 10 and a shaft 20 constitute opposite members of a cylindrical roll bearing. An outer ring 11, constituting an outer raceway ring, and an inner ring 21, constituting an inner raceway ring, are respectively mounted to the opposite members 10 and 20, respectively. A plurality of rollers 30 are disposed rollably between the outer ring 11 and inner ring 21.

The inner ring 21 of the cylindrical roll bearing is made of a material whose linear expansion coefficient $\alpha_{ji}$ is smaller than the linear expansion coefficient $\alpha_s$ of the shaft 20, and inclined surfaces are formed at both axial end surfaces 21a and 21b of the inner ring 21. The inclined surfaces are respectively slanted outwardly at angles $\theta_{1i}$ and $\theta_{2i}$ with respect to a vertical bearing center line 0—0. The inner ring 21 is fitted loosely to the shaft 20 with a clearance therebetween.

The inner ring 21 is sandwiched at both axial end surfaces 21a and 21b between confronting surfaces of distance pieces 22 and 23. The distance pieces 22 and 23 are interference-fitted to the shaft 20. The distance pieces 22 and 23 are made of a material having a linear expansion coefficient substantially equal to the linear expansion coefficient $\alpha_s$ of the shaft 20.

When the cylindrical roll bearing described above is used under a condition in which a temperature change occurs during operation of the bearing, because of a difference between the linear expansion coefficients $\alpha_{ji}$ and $\alpha_s$, perpendicular forces due to thermal stress will act on both side end surfaces 21a and 21b resulting in breakage of the inner ring 21. However, it is possible to prevent the perpendicular forces due to the thermal stress from acting on the end surfaces 21a and 21b by setting the angles of inclination $\theta_{1i}$ and $\theta_{2i}$ of the end surfaces 21a and 21b of the inner ring 21 in the following manner.

Supposing that an axial length of the inner ring 21 at the center of its thickness is $W_{pi}$, and a diameter thereof is $D_{pi}$, taking a relative change in the axial length of the inner ring 21 at the center of the thickness due to a temperature rise $\Delta T$, changes $\Delta x_{1i}$ and $\Delta x_{2i}$ in the axial length respectively at one end surface 21a and the other end surface 21b with respect to the bearing center line 0—0 are expressed by $$\Delta X_{1i} = (\alpha_s - \alpha_{ji}) \cdot \Delta T \cdot (W_{pi} - D_{pi} \tan \theta_{1i})/2 \quad (1)$$
$$\Delta X_{2i} = (\alpha_s - \alpha_{ji}) \cdot \Delta T \cdot (W_{pi} - D_{pi} \tan \theta_{2i})/2$$

Similarly, changes $\Delta Y_{1i}$ and $\Delta Y_{2i}$ in length in the radial direction at the one end surface 21a and the other end surface 21b with respect to the bearing center line 0—0 are expressed by $$\Delta Y_{1i} = (\alpha_s - \alpha_{ji}) \cdot \Delta T \cdot (D_{pi} - W_{pi}/\tan \theta_{1i})/2 \quad (2)$$
$$\Delta Y_{2i} = (\alpha_s - \alpha_{ji}) \cdot \Delta T \cdot (D_{pi} - W_{pi}/\tan \theta_{2i})/2$$

From the above formulas (1) and (2), in order that the perpendicular forces due to the thermal stress do not act on the end surfaces 21a and 21b, the following relations must be satisfied.

$$\Delta X_{1i} + \Delta X_{2i} = 0 \quad (3)$$
$$\Delta Y_{1i} + \Delta Y_{2i} = 0$$

Accordingly, when the above formulas (1), (2), and (3) are solved under a condition $$\alpha_s \neq \alpha_{ji}, \Delta T \neq 0$$

the following relation can be obtained $$\tan \alpha_{1i} + \tan \alpha_{2i} = 2 W_{pi}/D_{pi} \quad (4)$$

As a result, for the inner ring 21 of given dimensions including an outer diameter, inner diameter, and a width (an axial length), the angles of inclination $\theta_{1i}$ and $\theta_{2i}$ of the end surfaces 21a and 21b can be obtained so that the above formula (4) is satisfied.

The angles of inclination $\theta_{1i}$ and $\theta_{2i}$ of the end surfaces 21a and 21b may be selected to be the same angle, and in this case, the above formula (4) is expressed by $$\tan \theta_{1i} = \tan \theta_{2i} = W_{pi}/D_{pi}$$

The outer ring 11 of the cylindrical roll bearing mentioned above may be made of a material having a linear expansion coefficient smaller than the linear expansion coefficient of the bearing box 10, and inclined surfaces may be formed at both end surfaces of the outer ring 11 having angles of inclination extending outwardly with respect to the bearing center line 0—0 similarly to the inner ring 21. In this case, the angles of inclination of the end surfaces of the outer ring 11 are selected so that the formula (4) is satisfied between an axial length of the outer ring 11 at the center of the thickness, and a diameter thereof as described as to the inner ring 21. The outer ring 11 is fitted to the bearing box 10 by loose fitting or interference fitting. Furthermore, the end surfaces of the outer ring 11 are sandwiched by distance pieces having a substantially equivalent linear expansion coefficient to that of the bearing box 10, and the distance pieces are fixed to the bearing box 10 by interference fitting. In this manner, it is possible to prevent the perpendicular forces due to thermal stress from acting on both end surfaces of the outer ring 11, even when the temperature rises during operation and exceeds the temperature at the time of mounting of the bearing.

Figure 2:
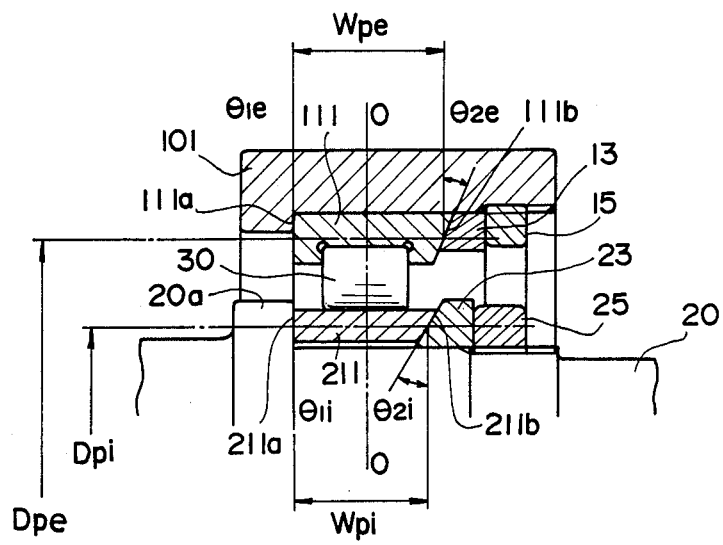
FIG. 2 is a longitudinal sectional view of an upper half portion of a bearing assembly including a cylindrical roll bearing illustrating another embodiment of the invention.

FIG. 2 is a longitudinal sectional view of a bearing assembly including a cylindrical roll bearing illustrating another embodiment of the present invention.

In this embodiment, the present invention is applied to both inner ring 211 and outer ring 111. The inner ring 211 is made of a material having a linear expansion coefficient $\alpha_{ji}$ smaller than the linear expansion coefficient $\alpha_s$ of the shaft 20. The outer ring 111 is made of a material having a linear expansion coefficient $\alpha_{je}$ which is smaller than the linear expansion coefficient $\alpha_h$ of the bearing box 101.

One end surface 211a of the inner ring 211 is a vertical surface normal to a plane including an axial center line of the bearing where angle $\theta_{1i}$ with respect to the axial center line 0—0 is zero. The other end surface 211b is an inclined surface slanted outwardly with respect to the bearing center line 0—0 at an angle $\theta_{2i}$. The inner ring 211 is fixed to the shaft 20 with a loose fit. Specifically, one end surface 211a of the inner ring 211 abuts against an end surface of a large diameter portion 20a of the shaft 20, and the other end surface 211b is in contact with a confronting surface of a distance piece 23. The distance piece 23 is clamped and secured by an inner ring clamp nut 25 which is threaded to the shaft 20. The distance piece 23 is made of a material having a linear expansion coefficient substantially equivalent to the linear expansion coefficient $\alpha_s$ of the shaft 20.

One end surface 111a of the outer ring 111 is a vertical surface normal to a plane including the axial center line of the bearing similarly to the inner ring 211 where angle $\theta_{1e}$, with respect to the axial center line 0—0 is zero. The other end surface 111b is an inclined surface slanted outwardly with respect to the bearing center line 0—0 at an angle $\theta_{2e}$. The outer ring 111 is fixed to the bearing box 101 with an interference fit. The one end surface 111a abuts against a stepped surface of the bearing box 101, and the other end surface 111b is in contact with a confronting surface of a distance piece 13 which is fitted into the bearing box 101. The distance piece 13 is clamped and secured by an outer ring clamp nut 15 which is threaded to the bearing box 101. The distance piece 13 is made of a material having a linear expansion coefficient substantially equivalent to a linear expansion coefficient $\alpha_h$ of the bearing box 101.

The angles $\theta_{1i}$ and $\theta_{2i}$ of the end surfaces 211a and 211b of the inner ring 211, with respect to the bearing center line 0—0, are set similarly to the case of FIG. 1, so that an axial length $W_{pi}$ of the inner ring 211 at the center of the thickness and a diameter $D_{pi}$ thereof satisfy the following relationship (4)

$$\tan \theta_{1i} + \tan \theta_{2i} = 2W_{pi}/D_{pi}$$

In this embodiment, since the angle at one end surface 211a is $\theta_{1i}=0$, the angle $\theta_{2i}$ at the other end surface 211b may be set to satisfy the following relationship $$\tan \theta_{2i} = 2W_{pi}/D_{pi}$$

Furthermore, the angles $\theta_{1e}$ and $\theta_{2e}$ at the end surfaces 111a and 111b of the outer ring 111 with respect to the bearing center line 0—0 are set similarly to the case of the inner ring 211, so that an axial length $W_{pe}$ of the outer ring 111 at the center of the thickness and an outer diameter $D_{pe}$ satisfy the following relationship $$\tan \theta_{1e} + \tan \theta_{2e} = 2W_{pe}/D_{pe}$$

In this embodiment, since the angle at one end surface 111a of the outer ring 111 is $\theta_{1e}=0$, the angle $\theta_{2e}$ at the other end surface 111b may be set to satisfy the relationship $$\tan \theta_{2e} = 2W_{pe}/D_{pe}$$

In the cylindrical roll bearing in this embodiment, when a temperature rise occurs during operation exceeding the temperature at the time of mounting the bearing, no relative changes are caused in length in the axial direction and in the radial direction at both end surfaces 211a and 211b of the inner ring 211, and no relative changes are caused in length in the axial direction and in the radial direction at both end surfaces 111a and 111b of the outer ring 111. As a result, no perpendicular forces act on the end surfaces 211a and 211b of the inner ring 211, and on the end surfaces 111a and 111b of the outer ring 111.

Figure 3:
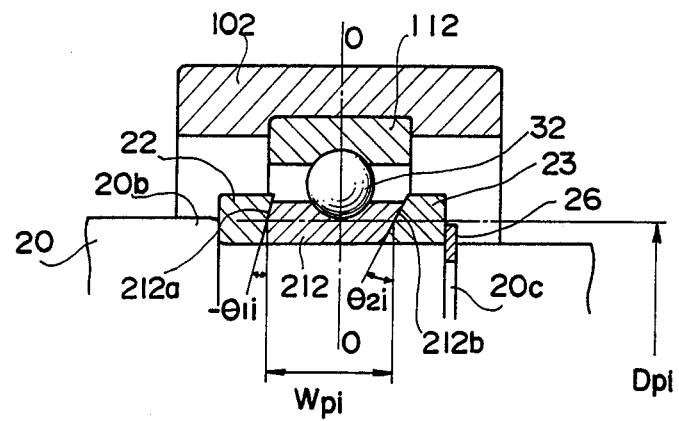
FIG. 3 is a longitudinal sectional view of an upper half portion of a bearing assembly including a ball bearing illustrating another embodiment of the invention.

FIG. 3 is a longitudinal sectional view of an upper half portion of a bearing assembly including a ball bearing illustrating another embodiment of the invention.

A plurality of balls 32 are rollably disposed between an outer ring 112 mounted to a bearing box 102 and an inner ring 212 mounted to a shaft 20.

The inner ring 212 of the ball bearing is made of a material having a linear expansion coefficient $\alpha_{ji}$ smaller than a linear expansion coefficient $\alpha_s$ of the shaft 20.

One end surface 212a of the inner ring 212 is an inclined surface which is slanted at an angle $\theta_{1i}$ extending inwardly with respect to the bearing center line 0—0, and the other end surface 212b is an inclined surface slanted at an angle $\theta_{2i}$ extending outwardly with respect to the bearing center line 0—0.

Both end surfaces 212a and 212b of the inner ring 212 are sandwiched between confronting surfaces of distance pieces 22 and 23 which are fixed to the shaft 20 with an interference fit. The one distance piece 22 abuts against a shoulder 20b of the shaft 20, and the other distance piece 23 is secured by an inner ring clamp 26 fixed to an annular groove 20c. These distance pieces 22 and 23 are made of a material having a linear expansion coefficient substantially equivalent to linear expansion coefficient $\alpha_s$ of the shaft 20.

The angles $\theta_{1i}$ and $\theta_{2i}$ of the end surfaces 212a and 212b of the inner ring 212 with respect to the bearing center line 0—0 are set so that the aforementioned relationship (4) is satisfied between an axial length $W_{pi}$ of the inner ring 212 at the center of the thickness and a diameter $D_{pi}$ thereof. When one end surface 212a of the inner ring 212 is inclined in an inward direction with respect to the bearing center line 0—0 as in this embodiment, the angles $\theta_{1i}$ and $\theta_{2i}$ may be set so that these angles satisfy the following relationship with a negative sign applied to the angle $\theta_{1i}$ $$\tan \theta_{1i} + \tan \theta_{2i} = 2W_{pi}/D_{pi}$$

In the ball bearing in this embodiment, even when the temperature is lowered during operation below the temperature at the time of mounting of the bearing, no relative changes are caused in length in an axial direction and in a radial direction due to a temperature difference. Accordingly, no perpendicular forces due to thermal stress act on the end surfaces 212a and 212b.

Figure 4:
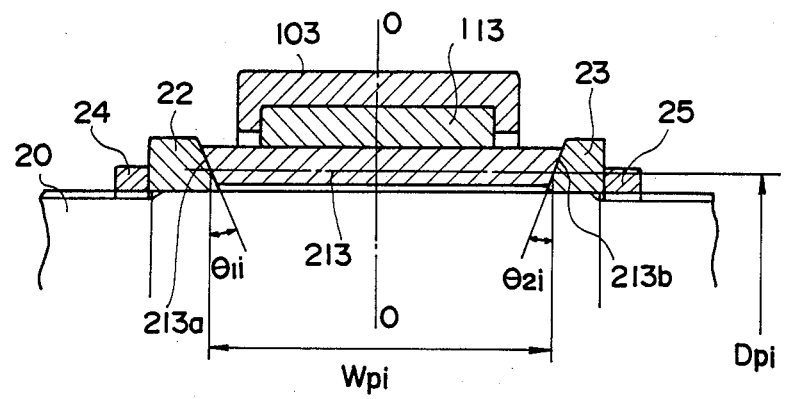
FIG. 4 is a longitudinal sectional view of an upper half portion of a bearing assembly including a slide bearing illustrating another embodiment of the invention.

FIG. 4 is a longitudinal sectional view of an upper half portion illustrating another embodiment of the invention as applied to an inner raceway ring (rotary shaft) of a slide bearing.

A bearing metal 113 constituting an outer raceway and a rotary shaft 213 constituting an inner raceway are respectively mounted to a bearing box 103 and a shaft 20 with a suitable bearing clearance maintained therebetween. The bearing box 103 and the shaft 20 are opposite members of the slide bearing to which the slide bearing is mounted.

The rotary shaft 213 of the slide bearing is made of a material having a linear expansion coefficient $\alpha_{ji}$ which is smaller than the linear expansion coefficient $\alpha_s$ of the shaft 20. End surfaces 213a and 213b of the rotary shaft 213 are inclined respectively at angles $\theta_{1i}$ and $\theta_{2i}$ with respect to the bearing center line 0—0 extending outwardly, and the rotary shaft 213 is fixed to the shaft 20 with loose fitting.

Both end surfaces 213a and 213b of the rotary shaft 213 are sandwiched between confronting surfaces of distance pieces 22 and 23 which are fitted to the shaft 20. The distance pieces 22 and 23 are clamped and secured by rotary shaft clamp nuts 24 and 25 which are threaded to the shaft 20. The distance pieces 22 and 23 are made of a material having a linear expansion coefficient substantially equivalent to the linear expansion coefficient $\alpha_s$ of the shaft 20.

Angles $\theta_{1i}$ and $\theta_{2i}$ of the end surfaces 213a and 213b of the rotary shaft 213 with respect to the bearing center line 0—0 are set so that a relation between an axial length $W_{pi}$ and a diameter $D_{pi}$ at the center of the thickness of the rotary shaft 213 satisfy the aforementioned relationship (4), that is $$\tan \theta_{1i} + \tan \theta_{2i} = 2W_{pi}/D_{pi}$$

In the slide bearing of this embodiment, even when the temperature during operation exceeds the temperature at the time of mounting of the bearing, no relative changes are caused in length, in an axial direction, and in a radial direction at both end surfaces 213a and 213b of the rotary shaft 213 due to the temperature differences. As a result, no perpendicular forces due to thermal stress act on the end surfaces 213a and 213b.

As described in the foregoing, in a bearing assembly of the present invention, a surface inclined with respect to a vertical bearing center line is formed at one or both end surfaces of at least one raceway ring having a linear expansion coefficient different from that of a member to which the bearing is mounted. The raceway ring is fitted to the member with fit corresponding to a working condition, and with the inclined surfaces in contact with a distance piece having a linear expansion coefficient substantially equivalent to that of the member. An angle of the inclined surface of the end surface of the raceway ring, with respect to the bearing center line, is set so that a relative between an axial length and a diameter of the raceway ring at the center of the thickness thereof satisfies a predetermined relationship. Thus, in this arrangement, even when a temperature change occurs during use of the bearing to a higher or lower temperature than the temperature at the time of mounting of the bearing, a relative change in length in the axial direction and in the radial direction at both end surfaces of the raceway ring is not caused.

Accordingly, in the present invention in which at least one raceway ring of a bearing has a linear expansion coefficient different from that of a member to which it is mounted, even when a temperature change occurs during use of the bearing, no perpendicular forces due to thermal stress act on both side end surfaces of the raceway ring. As a result, it is possible to prevent the performance of the bearing from degrading due to breakage or failure of the raceway ring, and it is possible to maintain the function of the bearing assembly for a long time.

Furthermore, in the present invention, an angle of inclination of at least one side end surface of the raceway ring which has a linear expansion coefficient different from that of the member to which it is mounted, can be set in accordance with only the particulars of the dimensions of the raceway ring sitself, without taking the relative magnitude of the linear expansion coefficient of the opposite member into consideration. Accordingly, the design of the bearing is very easy, and the bearing assembly of the present invention is applicable to various types of bearings regardless of the combination of the raceway ring and the member to which it is mounted.

While certain embodiments of the invention have been described in detail above in relation to a bearing assembly, it will be apparent to those skilled in the art that the disclosed embodiment may be modified. Therefore, the foregoing description is to be considered exemplary rather than limiting, and the true scope of the invention is that defined in the following claims.

What is claimed is:

1. In a bearing assembly comprising:
   a bearing mounting member:
   a bearing mounted to said bearing mounting member and including an inner raceway ring having first and second end surfaces, at least one of said inner and outer raceway rings having a linear expansion coefficient different from that of said bearing mounting member, and having an inclined surface formed on at least one of said end surfaces inclined with respect to a vertical bearing center line;
   a distance piece abutting against said inclined end surface of said at least one raceway ring and secured to said bearing mounting member, said distance piece having a linear expansion coefficient substantially equivalent to that of said bearing mounting member; the improvement in which:
   said at least one raceway ring, having a linear expansion coefficient different from that of said bearing mounting member, has inclined surfaces formed on both of said end surfaces, and angles of inclination, $\theta_1$ and $\theta_2$ of said inclined surfaces, with respect to the vertical bearing center line, are determined to satisfy the following relationship between an axial length Wp and a diameter Dp of said at least one raceway ring measured at the center of a thickness thereof: $\tan \theta_1 + \theta_2 = 2Wp/Dp$
   said angles $\theta_1$, $\theta_2$ being assigned with a positive sign when the angle is extending outwardly with respect to the vertical bearing center line, and with a negative sign when the angle is extending inwardly; and
   said at least one raceway ring mounted to said bearing mounting member with a predetermined fit in accordance with a relation in magnitude between the linear expansion coefficients of said at least one raceway ring and said bearing mounting member, and working temperature conditions of the bearing assembly, such that said inner raceway ring is loose fitted when the linear expansion coefficient of said inner raceway ring is smaller than that of said bearing mounting member and said bearing assembly is used at a temperature higher than that during mounting and when the linear expansion coefficient of said inner raceway ring is larger that of said bearing mounting member and said bearing assembly is used at a temperature lower than that during mounting, and said inner raceway ring is interference fitted when the linear expansion coefficient of said inner raceway ring is smaller than that of said bearing mounting member and said bearing assembly is used at a temperature lower than that during mounting and when the linear expansion coefficient of said inner raceway ring is larger than that of said bearing mounting member and said bearing assembly is used at a temperature higher than that during mounting.

* * * * *